Patented Jan. 19, 1954

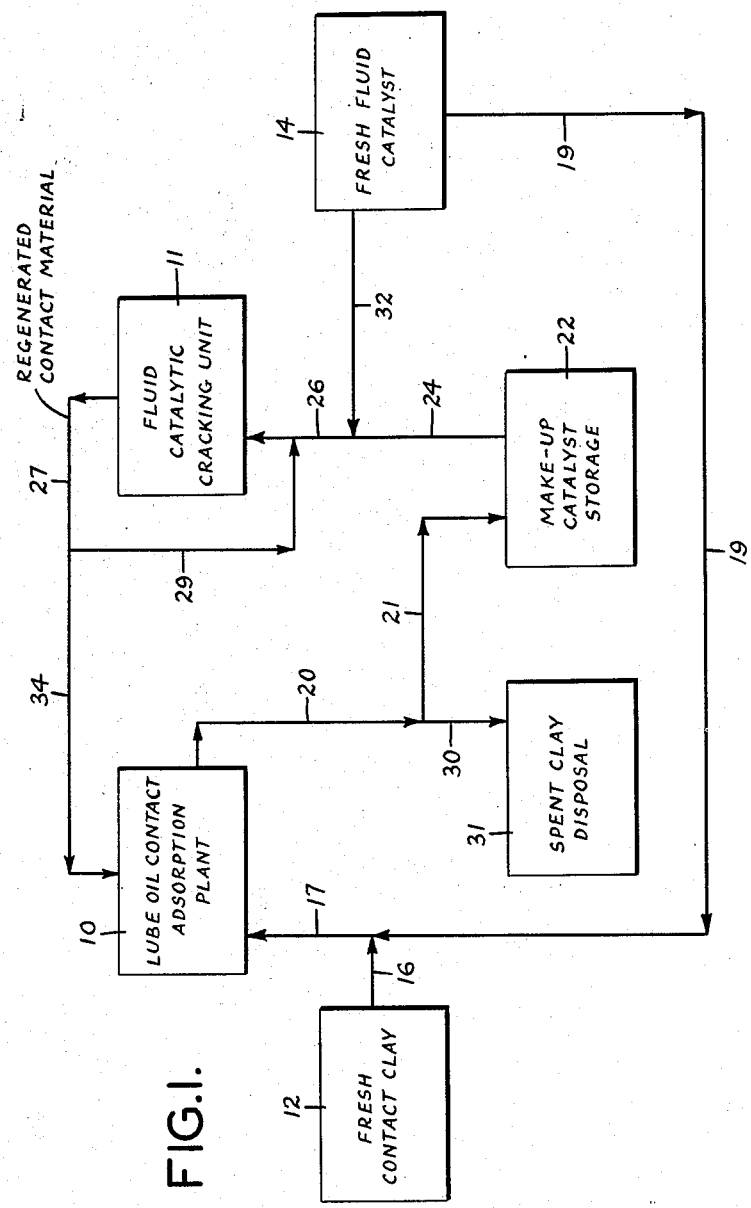

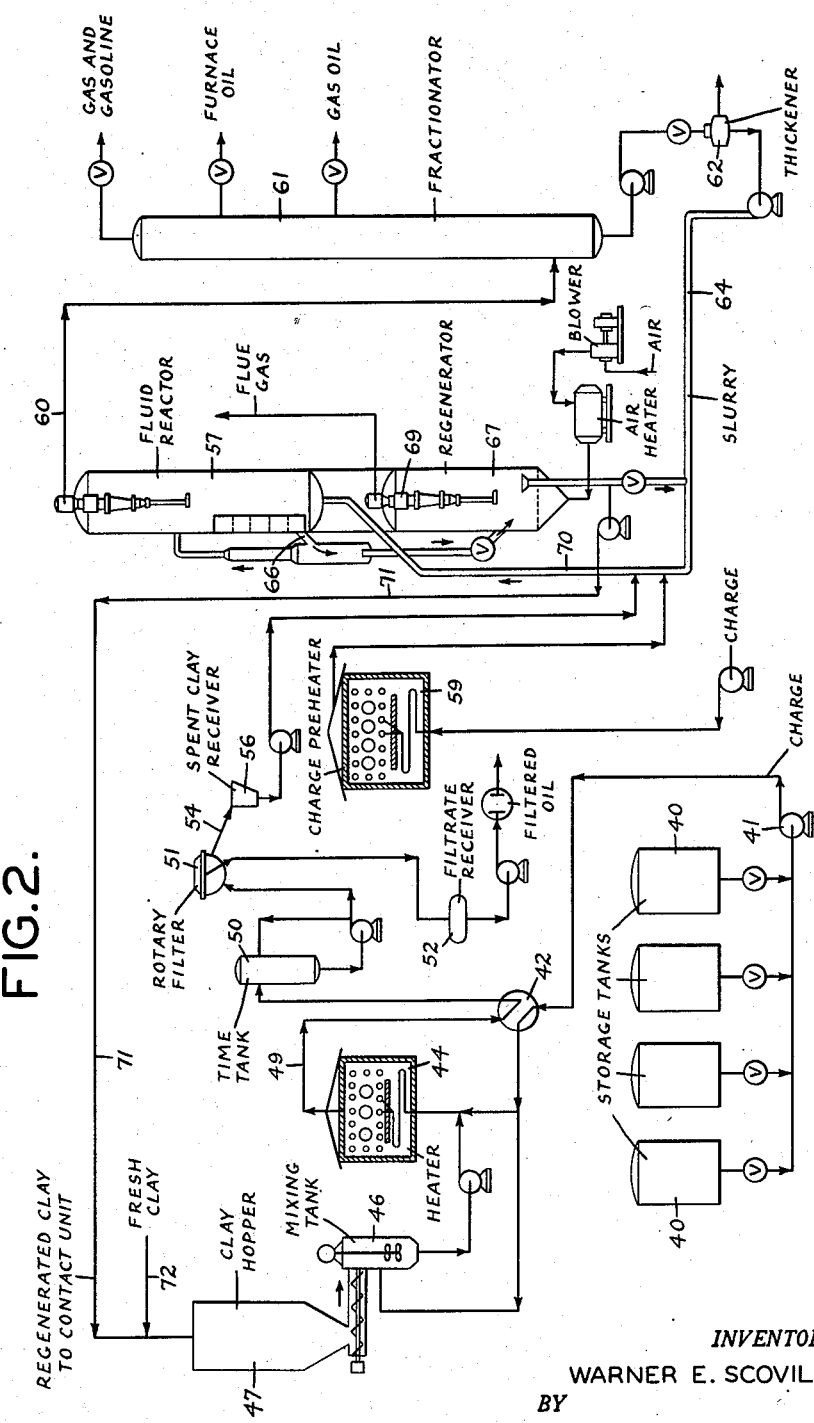

2,666,733

UNITED STATES PATENT OFFICE 2,666,733

METHOD OF TREATING HYDROCARBONS

Warner E. Scovill, Lakewood, Ohio, assignor to The Standard Oil Company, Cleveland, Ohio, a corporation of Ohio Application April 27, 1950, Serial No. 158,479

3 Claims. (Cl. 196—52)

The present invention relates to a method of treating hydrocarbons with a finely divided adsorbent contact catalytic material in powder form and more particularly to a combination of contact adsorption and fluid catalytic cracking processes that may be widely spaced in time and distance, wherein the same material is used as the adsorption contact medium and the fluid cracking catalyst.

To cite an illustrative example without, however, intending to limit the scope of this invention thereto, the principles of this invention may be applied to the decolorization of lubricating oils by the contact method and to the fluid catalytic cracking of hydrocarbons to form gasoline. By such an application it is possible to utilize a fluid catalytic cracking unit not only for the cracking of hydrocarbons but, in addition, for the regeneration of lubricating oil contact material.

The terms "adsorbent contact catalytic material" and "contact material" as used herein refer to finely divided materials having adsorbent properties as well as catalytic activity. These materials include contact clays and fluid catalysts generally known in the art to have an extremely small particle size, e. g., about 95% of the particles of any given material normally pass through a 200-mesh screen, and are to be distinguished from materials such as percolation clays and fixed bed catalysts, wherein the particles are pellets or granules that ordinarily do not pass through a screen finer than 90 mesh.

It has now been found that the contacting of lubricating oils with adsorbent contact catalytic material for decolorizing the oils has no deleterious effect upon the catalytic activity of the material and that such material, after being used as a contact adsorption agent, may be used as catalyst in a fluid cracking operation and, if desired, be regenerated in a fluidized regenerating zone for recycling to a contact adsorption or fluid cracking operation, or both. The undesirable hydrocarbons adsorbed on the contact material during the decolorizing step are subjected to cracking, and therefore converted into desirable hydrocarbons of lower molecular weight, in the fluid cracking operation. Carbon or coke remaining on the contact material leaving the fluid reactor is burned off in the fluidized regenerating zone. This is to be distinguished from methods wherein spent contact clays or percolation clays, after contact with a lubricating oil, are mixed with a gas oil charge that is then subjected to thermal cracking in the liquid phase. Such methods inherently do not involve removal or conversion of the adsorbed hydrocarbons during the cracking step.

The present invention, therefore, contemplates a method of utilizing an adsorbent contact catalytic material or a combination of several such materials, the choice of contact material depending upon requirements described more fully hereinafter, as both an adsorbent and a fluid catalyst in a unitary system or in separate systems. In the preferred embodiment of the invention, a contact material, or combination of contact materials is utilized first as an adsorbent for refining hydrocarbon oils in the liquid phase by the contact method and then as a fluid catalyst for the conversion of hydrocarbons such as naphtha-gas oil hydrocarbon fractions. The contact material may then be regenerated and recycled to the adsorbing unit, the fluid cracking unit, or both.

One of the advantages of this invention is that it provides a simple and economical means for regenerating contact materials known primarily for their adsorbent properties but nevertheless possessing appreciable catalytic activity.

Another advantage of the invention, when applied to a combination of contact decolorization and fluid cracking processes, is that it provides a simple means for recovering the undesirable hydrocarbons removed from lubricating oils in the adsorption process and making them available for catalytic cracking.

Another advantage of the invention is that it may be utilized for the treatment of any lubricating oil whether it be unrefined, solvent treated or acid treated.

Still another advantage of the invention is that it makes possible appreciable economies in the operation of a contact plant, fluid cracking plant, or both.

The contact material employed in the method of this invention may be any material having the particle size hereinbefore specified and known to have adsorptive as well as catalytic properties. The preferred material includes the silica-alumina type catalysts commonly referred to as contact clays, such as members of the group of acid-activated, natural clays made from the mineral montmorillonite, available from the Filtrol Corporation and marketed under trade names such as "Filtrol" and "Super Filtrol" lube contact clays, as well as fluid catalysts of the natural clay type available under the trade name "Filtrol D" and fluid catalysts made synthetically by precipitating alumina and silica, which are available as the spray-dried and oil dropped "Microsphere" type and "Diakell" catalysts available from The Universal Oil Products Company and M. W. Kellogg Company, respectively.

The method of this invention is further illustrated in the accompanying drawing, wherein:

Figure 1 is a diagrammatic flow sheet; and

Figure 2 is a flow sheet illustrating one preferred embodiment of the method of this invention.

Referring now to Figure 1 of the drawing, a lubricating oil contact plant 10 and a fluid catalytic cracking unit 11 may be supplied with contact material in the form of contact clay from source 12, fluid type catalyst from source 14 or both depending upon the requirements of the contact plant and the fluid cracking unit.

The requirements of a fluid catalytic cracking unit, in so far as the amount of make-up catalyst is concerned, depends upon the size of the unit, the type of fluid catalysts, and other idiosyncracies of the plant.

The requirements of a lubricating oil contact plant, in so far as the amount of contact medium is concerned, depends likewise upon the size of the plant, the contact dosages used, and other variables well known in the art.

Where the requirements of a fluid catalytic cracking unit are exactly balanced by the requirements of a contact plant, i. e., where the amount of make-up catalyst required by the cracking unit is equal to the amount of contact material used in the contact plant in the same time interval, the whole mass of contact material leaving the contact plant may be charged to the fluid cracking unit as make-up catalyst.

In this embodiment, contact material from source 12 or 14 or both, in an amount equal to the make-up catalyst required by the cracking unit 11, is supplied to the contact plant 10 by way of lines 16 and 17 or lines 19 and 17. After the spent contact material has been separated from the oil contacted in the contact plant 10, it is passed by way of lines 20 and 21 to make-up catalyst storage 22 and from there to the fluid cracking unit by way of lines 24 and 26. After regeneration, the regenerated contact material is recycled to the cracking unit by way of lines 27 and 29.

Where the requirements of a contact plant are limiting, i. e., where the amount of contact material used exceeds the amount of make-up catalyst required by the fluid catalytic cracking unit, several alternative procedures in accordance with the present invention are contemplated.

One such procedure is to operate the contact plant cyclically with a high activity fluid catalyst and a contact clay. Thus, for example, fresh make-up fluid catalyst and, if desired, regenerated catalyst may be used in the contact plant and passed to the catalytic unit during one cycle, and contact clay may be used in the contact plant and then disposed of in the other cycle. This procedure can be varied by introducing the fresh make-up catalyst directly into the cracking unit and passing an amount of regenerated catalyst equal to the amount of fresh make-up catalyst to the contact plant for recycling to the cracking unit.

Thus, for example, fresh fluid catalyst from source 14 in an amount equal to the make-up catalyst required by the cracking unit 11 is passed during one cycle into the contact plant 10 by way of lines 19 and 17 and, after being separated from the oil contacted therewith, is passed into make-up catalyst storage 22 by way of lines 20 and 21. From this point, the make-up catalyst is added as required by way of lines 24 and 26 to the regenerated catalyst recycled to the cracking unit by way of lines 27 and 29. In the other cycle, fresh contact clay from source 12 is supplied to the contact plant 10 by way of lines 16 and 17 and, after being separated from the oil contacted therewith, is removed by way of lines 20 and 30 to spent clay disposal 31.

If desired, this procedure can be varied during the first cycle by utilizing fresh fluid catalyst from source 14 directly as the make-up catalyst. This is accomplished by passing it directly to the cracking unit 11 by way of lines 32 and 26 and passing, to the contact plant 10 by way of line 34, an amount of regenerated contact material equal to the amount of fresh catalyst introduced as make-up catalyst. The regenerated catalyst, after being separated from the oil contacted therewith, is recycled to the cracking unit 11 by way of lines 20 and 21, make-up catalyst storage 22 and lines 24 and 26.

This procedure has the advantage, peculiar to it, of operating the fluid catalytic cracking unit at maximum efficiency due to the use therein of high activity fluid catalysts only, and of reducing substantially the amount of contact clay required by the contact adsorption plant.

EXAMPLE

A contact adsorption plant for decolorizing lubricating oil in the liquid phase and having a capacity for processing 500 barrels per day of solvent extracted bright stock having a viscosity of 120 SUS at 210° F. and requiring 3.75 tons of "Filtrol" lube contact clay per day to reduce the optical density of the oil to about 90, was run cyclically on Kellogg "Diakell" fluid catalyst and "Filtrol" lube contact clay. A fluid catalytic cracking plant for the conversion of 15,000 barrels per day of a naphtha-gas oil to gasoline was run on Kellogg "Diakell" fluid catalyst, the make-up requirements of the cracking being supplied by fluid catalyst from the adsorption plant.

The contact plant was run for 16 days on 60 tons of fresh Kellogg "Diakell" fluid catalyst having an initial "Cat A" activity of 40.7. It was found that the optical density of 8,000 barrels of oil was reduced to an average of 89.0 and that the "Cat A" activity of the catalyst, after contact with the oil at a rate of 15 pounds per barrel, had increased to 41.5. This catalyst was then used for 20 days as make-up catalyst in the fluid cracking plant.

The contact plant was then run for 4 days on 15 tons of fresh "Filtrol" lube contact clay (X-417). It was found that the optical density of 2,000 barrels of oil was reduced to an average of 93.0.

An alternative procedure is to operate the contact plant and the fluid catalytic cracking unit with a contact clay alone. Thus, for example, a portion of the spent contact clay from the contact plant equal to the sum of amounts of make-up and regenerated catalyst may be passed to the cracking plant and the regenerated clay may be recycled to the contact plant, a sufficient amount of fresh contact clay being added to the contact plant to make up for the spent clay not passed to the cracking unit and for that lost during regeneration. One variation of this procedure, if the capacity of the regenerator permits, is to pass directly to the regenerator from the contact plant the spent clay that is not passed to the cracking unit.

Thus, for example, fresh contact clay in an amount equal to the make-up requirements of the fluid cracking unit 11 may be introduced into the contact plant 10 from source 12 by way of lines 16 and 17. After contacting the oil in contact plant 10, an amount of the spent clay separated from the oil equal to the amount of make-up catalyst required and the amount of contact material regenerated is passed to the cracking unit 11 by way of lines 20 and 21, make-up catalyst storage 22 and lines 24 and 26, the balance being sent to clay disposal 31 by way of line 30 and the regenerated contact clay being recycled to the contact plant 10 by way of lines 27 and 34.

If the capacity of the regenerator permits, that portion of the spent contact clay from contact plant 10 not passed to the cracking unit 11 may be passed directly to the regenerator and then recycled back to the contact plant 10 along with the regenerated contact clay from cracking unit 11.

This procedure has the advantages, peculiar to it, of utilizing to the fullest the catalytic activity of spent contact clays, of recovering, for cracking purposes, an appreciable portion of the hydrocarbons removed from the lubricating oil in the contact plant, and of utilizing the regenerator of the fluid cracking plant for regenerating contact clay in an economically feasible manner.

Where, on the other hand, the requirements of a fluid catalytic cracking unit are limiting, it is usually preferable to utilize a high activity fluid catalyst in both plants. In this embodiment, a proportion of the contact material equal to that required by the contact plant is circulated between the contact plan and the cracking unit and an amount of fresh material equivalent to the amount of make-up catalyst required by the cracking unit is introduced at any desired point in the system.

Thus, for example, the contact plant 10 is supplied with the amount of regenerated catalyst required by way of line 34, the balance is recycled directly to the fluid catalytic cracking unit by way of line 29, and the portion used in the contact plant 10 is recycled to the cracking unit 11 by way of lines 20 and 21, make-up catalyst storage 22 and lines 24 and 26. Fresh fluid catalyst from source 14 is used to satisfy the make-up requirements of the cracking unit 11 and is added by way of lines 32 and 26 or, if desired, by way of lines 19 and 17, in which event the amount of regenerated catalyst passed to the contact plant 10 by way of line 34 is reduced so that the total amount of the fluid catalyst supplied to the contact plant does not exceed its requirements.

This method has the advantage, peculiar to it, of making it unnecessary to provide special contact material for the contact plant while not interfering with the productivity of the fluid catalytic cracking unit.

Referring now to Figure 2 of the drawing, there is illustrated a preferred embodiment of the invention distinguished by the fact that the contact material, after having been subjected to contact with oil to be clay treated, which term is intended to include not only raw oil but oil that has been subjected to solvent refining or acid treatment, is passed to the reactor unit of the catalytic cracking plant before entering the regenerator.

In this embodiment a portion of the oil from storage tanks 40 is passed by means of a pump 41 through a heat exchanger 42 directly to a heater 44 and another portion is passed to the heater 44 by way of a mixing tank 46. Contact material, such as adsorbent clay from a hopper 47, is introduced into the mixing tank 46 and from there passed into the heater 44 with the second portion of oil to be treated. The heated mixture leaves the heater 44 by way of line 49, passes through the heat exchanger 42 and is introduced into a time tank 50 to allow a predetermined time of contact between the contact material and the oil. From the time tank 50, the mixture is passed into a rotary filter 51 from whence the filtrate passes into a filtrate receiver 52 and ultimately to a receiver for filtered oil. The contact material leaves the rotary filter 51 by way of line 54, passes through a spent clay receiver 56 and is pumped into the fluid reactor 57 with a preheated charge of fresh cracking stock from charge preheater 59.

The charge is subjected to cracking in the reactor 57 and leaves the reactor at the top by way of line 60 to a fractionator 61 wherein it is resolved into fractions of gas and gasoline, furnace oil, gas oil and a slurry that is recycled to the reactor by way of a thickener 62 and line 64.

The spent clay leaves the fluid reactor 57 by way of line 66 and is passed into the regenerator 67. The gaseous effluents from the regenerator 67 are passed through a cyclone separator 69 and leave the system as flue gas. A portion of the regenerated clay is recycled directly to the reactor 57 by way of line 70 and another portion of the regenerated clay is recycled to the clay hopper 47 by way of line 71. Fresh clay is added to the clay hopper 47 by way of line 72.

Tests have revealed that the catalytic activity, as determined by the standard "Cat A" test, of commercially available lubricating oil contact clay is 30 or over, and therefore sufficient to be used as a make-up catalyst to a fluid catalytic cracking unit. A comparison of the catalytic activity of one typical lubricating oil contact clay with two high activity fluid catalysts is given in Table 1 below:

Table 1
CATALYTIC ACTIVITY OF VARIOUS LUBE OIL CONTACT CLAYS AND FLUID CATALYSTS

| Experiment No. | Material | "Cat A" activity |
|---|---|---|
| 16891–93 | "Filtrol" lube contact clay (X-417) | 33.1 |
| 16927–29 | Kellogg "Diakell" fluid catalyst | 40.7 |
| 16931–33 | "Filtrol" grade D fluid catalyst | 41.5 |

Tests have also shown that the ability of fluid cracking catalysts to decolorize crude lubricating oil is comparable to the ability of cheaper contact clays of lesser catalytic activity. The results of such tests are listed in Table 2, the optical density listed in the last three columns being that of 1000 grams of solvent extracted bright stock having a viscosity of 120 SUS at 210° F. treated for 30 minutes at 450° F. with the stated amounts of fresh material, i. e., material not previously used for either lubricating oil contacting or fluid catalytic cracking.

Table 2

| Material | Optical density | | |
|---|---|---|---|
| | 5 lbs./bbl. (1.5 weight percent) | 10 lbs./bbl. (3.0 weight percent) | 15 lbs./bbl. (4.5 weight percent) |
| "Super Filtrol" lube contact clay | 159.0 | 127.3 | 111.5 |
| "Filtrol" lube contact clay (X-417) | 203.0 | 144.0 | 93.0 |
| Kellogg "Diakell" fluid catalyst | 147.2 | 146.0 | 89.0 |
| "Filtrol" grade D fluid catalyst | 148.0 | 110.3 | 88.2 |
| U. O. P. spray dried "Microspheres" fluid catalyst | 154.0 | 114.2 | 120.5 |
| U. O. P. oil dropped "Microspheres" | 178.2 | 203.0 | 144.0 |

Further tests showed that the catalytic activity of neither the less expensive contact clays nor the more expensive, high activity fluid catalysts was deleteriously affected by contacting them with oils. Table 3 shows the effects of contacting, for 30 minutes at 450° F., one contact clay and two high activity fluid catalysts with 1000 grams of heavy steam refined oil having a viscosity of 200 at 210° F. (raw, untreated cylinder stock). Table 4 shows the effect of contacting, for 30 minutes at 300° F., a high activity fluid catalyst with a solvent extracted bright stock having a viscosity of 120 SUS at 210° F. Table 5 indicates the change in "Cat A" activity of a contact clay after contact with the same oil under the same conditions.

ACTIVITY OF CRACKING CATALYSTS AND LUBE OIL CONTACT CLAYS AFTER USE IN LUBE OIL CONTACTING

Table 3

| Material | "Cat A" (fresh) | "Cat A" after contact | |
|---|---|---|---|
| | | 15 lbs./bbl. | 40 lbs./bbl. |
| "Filtrol" contact clay (X-417) | 33.1 | | 36.1 |
| Kellogg "Diakell" | 40.7 | | 39.9 |
| "Filtrol" grade D | 41.5 | 41.8 | 37.1 |

Table 4

| Material | "Cat A" (fresh) | "Cat A" after contact, 15 lbs./bbl. |
|---|---|---|
| Kellogg "Diakell" | 40.7 | 41.5 |

Table 5

| Material | "Cat A" (fresh) | "Cat A" after contact |
|---|---|---|
| "Filtrol" clay (X-417) | 33.1 | 31.4 |

The change in "Cat A" activity of a number of contact materials, as well as the optical density of 1000 gram samples of the oils after contact therewith for 30 minutes at a temperature of 300° F., are listed in Tables 6 and 7. The oil contacted in the tests reported in Table 6 was a 225 Red oil which had been acid treated to the extent of 16.8 lbs. of acid per barrel and the oil in tests reported in Table 7 was a dewaxed paraffin distillate dewaxed by chilling and filtering having a viscosity of 90–100 SUS at 100° F., and which had been acid treated with 10 lbs. of acid per barrel.

Table 6

CONTACTING 225 RED OIL

| Material | "Cat A" before contacting | Optical density after contacting | "Cat A" after contacting—10 lbs./bbl. (2.6 weight percent) |
|---|---|---|---|
| Kellogg "Diakell" | 41.0 | 6.9 | 47.5 |
| "Filtrol" (X-417) contact clay | 37.0 | 8.7 | 34.0 |
| "Filtrol" grade D fluid catalyst | 41.0 | 8.1 | 41.0 |
| U. O. P. spray dried "Microspheres" | 54.5 | 8.9 | 58.5 |
| "Super Filtrol" lube contact clay | | 15.4 | |

Table 7

| Material | "Cat A" before contacting | Optical density after contacting | "Cat A" after contacting—6.5 lbs./bbl. (1.8 weight percent) |
|---|---|---|---|
| Kellogg "Diakell" | 41.0 | 11.6 | 45.5 |
| "Filtrol" (X-417) contact clay | 37.0 | 9.7 | 36.0 |
| "Filtrol" grade D fluid catalyst | 41.0 | 9.5 | 39.0 |
| Spray dried "Microspheres" | 54.5 | 13.2 | 51.5 |

The catalyst activity was determined by the standard "Cat A" procedure and the materials used for clay contacting were blown dry with air prior to running the "Cat A" tests.

The term "optical density" in the present disclosure represents the standard logarithmic ratio of intensity of an incident ray falling on a transparent or translucent medium to the intensity of the transmitted ray for a sample length of one meter and light of wave length from 5100 to 5500 Angstroms.

This application is a continuation-in-part of my earlier co-pending application Serial No. 38,779, filed July 15, 1948, now abandoned.

It is to be understood that innumerable variations and modifications will immediately become apparent to those skilled in the art upon reading the foregoing disclosure. The invention contemplates all such variations and modifications as come within the scope of the appended claims.

I claim:

1. A method of treating hydrocarbons which comprises contacting a lubricating oil in the liquid phase in a contact zone with a finely divided, adsorbent silica-alumina contact catalytic material, having both adsorbent and catalytic properties and a particle size such that about 95% of the particles pass through a 200-mesh screen, for decolorizing said lubricating oil, separating said material from the decolorized oil, cracking hydrocarbons in a fluid catalytic cracking zone by contact with said separated contact catalytic material, regenerating said contact material in a fluidized regenerating zone, and recycling said regenerated contact material successively to said contact and fluid catalytic cracking zones.

2. A method of treating hydrocarbons which comprises contacting a lubricating oil in the liquid phase in a contact zone with a finely divided, adsorbent silica-alumina contact clay, having both adsorbent and catalytic properties and a particle size such that about 95% of the particles pass through a 200-mesh screen, for decolorizing said lubricating oil, separating said contact clay from the decolorized oil, cracking hydrocarbons in a fluid catalytic cracking zone by contact with said separated contact clay, regenerating said contact clay in a fluidized regenerating zone, and recycling said regenerated contact clay successively to said contact and fluid catalytic cracking zones.

3. A method of treating hydrocarbons which comprises contacting a lubricating oil in the liquid phase in a contact zone with a silica-alumina fluid catalyst, having both adsorbent and catalytic properties and a particle size such that about 95% of the particles pass through a 200-mesh screen, for decolorizing said lubricating oil, separating said fluid catalyst from the decolorized oil, cracking hydrocarbons in a fluid catalytic cracking zone by contact with said separated fluid catalyst, regenerating said fluid catalyst in a fluidized regenerating zone, and recycling said regenerated fluid catalyst successively to said contact and fluid catalytic cracking zones.

WARNER E. SCOVILL.

References Cited in the file of this patent

UNITED STATES PATENTS

| Number | Name | Date |
|---|---|---|
| 2,091,892 | Stratford | Aug. 31, 1937 |
| 2,416,729 | Arveson | Mar. 4, 1947 |
| 2,549,518 | Perry | Apr. 17, 1951 |

OTHER REFERENCES

Double-Duty Catalyst, by George West, Oil and Gas Journal, October 19, 1950, vol. 49, No. 42, pages 78, 79, 118, and 120.